(12) United States Patent
Oh et al.

(10) Patent No.: US 9,210,002 B2
(45) Date of Patent: Dec. 8, 2015

(54) TRANSMITTER, RECEIVER, AND CONTROLLING METHOD THEREOF

(71) Applicant: SAMSUNG ELECTRONICS CO., LTD., Suwon-si (KR)

(72) Inventors: Young-ho Oh, Suwon-si (KR); Sung-ryul Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/483,819

(22) Filed: Sep. 11, 2014

(65) Prior Publication Data

US 2015/0071374 A1 Mar. 12, 2015

(30) Foreign Application Priority Data

Sep. 12, 2013 (KR) .................. 10-2013-0109542

(51) Int. Cl.
*H04B 1/00* (2006.01)
*H04L 25/02* (2006.01)
*H04L 27/26* (2006.01)

(52) U.S. Cl.
CPC ........ *H04L 25/0224* (2013.01); *H04L 27/2602* (2013.01); *H04L 27/2656* (2013.01)

(58) Field of Classification Search
CPC ........ H04B 1/707; H04B 1/717; H04L 27/22; H04L 27/2332
USPC ........... 375/147, 295, 316, 343; 307/208, 334
See application file for complete search history.

(56) References Cited

U.S. PATENT DOCUMENTS

| | | | |
|---|---|---|---|
| 2007/0217524 A1* | 9/2007 | Wang et al. | 375/260 |
| 2009/0067517 A1 | 3/2009 | Hung et al. | |
| 2009/0175258 A1 | 7/2009 | Wang et al. | |
| 2009/0225741 A1* | 9/2009 | Wang et al. | 370/345 |
| 2010/0027723 A1 | 2/2010 | Kim et al. | |
| 2013/0332980 A1* | 12/2013 | Kobayashi et al. | 725/151 |
| 2014/0362781 A1* | 12/2014 | Yun | 370/329 |

FOREIGN PATENT DOCUMENTS

| | | |
|---|---|---|
| WO | 2006000091 A1 | 1/2006 |
| WO | 2007055469 A1 | 5/2007 |

OTHER PUBLICATIONS

Written Opinion dated Dec. 1, 2014 issued by the International Searching Authority in counterpart International Patent Application No. PCT/KR2014/008355 (PCT/ISA/237).

Search Report dated Dec. 1, 2014 issued by the International Searching Authority in counterpart International Patent Application No. PCT/KR2014/008355 (PCT/ISA/210).

* cited by examiner

*Primary Examiner* — Khai Tran
(74) *Attorney, Agent, or Firm* — Sughrue Mion, PLLC

(57) ABSTRACT

A receiver of a signal frame such as T2 frame used in a DVB-T2 system is provided. The receiver includes: a receiving unit configured to receive a frame including a preamble symbol in which a pseudo random noise (PN) sequence is inserted; a PN sequence detector configured to detect the PN sequence from the received frame; a controller configured to measure a start point of the preamble symbol and frequency offset of the PN sequence inserted in the preamble symbol, based on the detected PN sequence; and a preamble symbol detector configured to detect the preamble symbol according to the measured start point of the preamble symbol and the measured frequency offset of the PN sequence. Therefore, the receiver accurately measures the start point of the preamble symbol and the frequency offset and estimates a channel based on the PN sequence inserted in the preamble symbol.

20 Claims, 16 Drawing Sheets

900

TRANSMITTER, RECEIVER, AND CONTROLLING METHOD THEREOF

CROSS-REFERENCE TO RELATED APPLICATION(S)

This application claims priority under 35 U.S.C. §119 from Korean Patent Application No. 10-2013-0109542, filed on Sep. 12, 2013, in the Korean Intellectual Property Office, the disclosure of which is incorporated herein by reference in its entirety.

BACKGROUND

1. Field

Apparatuses and methods consistent with exemplary embodiments relate to transmitting and receiving signal frames using an orthogonal frequency division multiplexing (OFDM) method.

2. Description of the Related Art

Digital Video Broadcasting the Second Generation Terrestrial (DVB-T2) is a second generation European terrestrial digital broadcasting standard that is established by improving a performance of DVB-T which currently serves as a standard in 35 or more nations including Europe and have started. The DVB-T2 uses newest technologies such as low density parity check (LDPC) codes, 256 quadrature amplitude modulation (256 QAM) modulation method, etc. to increase a transmission capacity and realize high bandwidth efficiency. Therefore, various high-quality services such as a high-definition television (HDTV), etc. may be provided in a limited band.

A T2-frame that is currently used in the DVB-T2 includes a P1 preamble symbol, a P2 preamble symbol, and a data symbol. The P1 preamble symbol is used to perform synchronization and transmit signaling data. A receiver detects the P1 preamble symbol, performs synchronization by using the detected P1 preamble symbol, compensates for frequency offset, and obtains the signaling data from the P1 symbols.

However, a process of performing synchronization by using the P1 preamble symbol is performed based on the signaling data of the P1 preamble symbol.

FIG. 1 is a view illustrating that sub-carriers with which the signaling data of P1 preamble symbol is matched are randomly arranged. In other words, referring to FIG. 1, the sub-carriers with which the signaling data of the P1 preamble symbol is matched are not arranged at uniform intervals but are randomly arranged. Therefore, if synchronization is performed based on the signaling data of the P1 preamble symbol, it is difficult to accurately detect a preamble start point within one sample.

Also, the sub-carriers with which the signaling data of the P1 preamble symbol is matched are not arranged at the uniform intervals to be used as reference signals. Therefore, a channel estimation may not be performed.

Therefore, there is a need for a reference signal that accurately detects a preamble start point within one sample, measures frequency offset, and estimates a channel.

SUMMARY

One or more exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a transmitter that uses a preamble symbol into which a pseudo random noise (PN) sequence is inserted, a receiver, and a controlling method thereof.

According to an aspect of an exemplary embodiment, there is provided a receiver including: a receiving unit configured to receive a frame including a preamble symbol in which a pseudo random noise (PN) sequence is inserted; a PN sequence detector configured to detect the PN sequence from the received frame; a controller configured to measure a start point of the preamble symbol and frequency offset of the PN sequence inserted in the preamble symbol, based on the detected PN sequence; and a preamble symbol detector configured to detect the preamble symbol according to the measured start point of the preamble symbol and the measured frequency offset of the PN sequence.

The PN sequence detector may detect the PN sequence from a frequency band corresponding to the PN sequence by using a band-pass filter.

The PN sequence detector may shift a frequency band corresponding to the preamble symbol to arrange a frequency band corresponding to the PN sequence in a predetermined frequency band and detects the PN sequence from the predetermined frequency band.

The controller may compare the detected PN sequence with a pre-stored PN sequence and, when the detected PN sequence matches with the pre-stored PN sequence, detect a certain correlation value, and measure the start point of the preamble symbol and the frequency offset of the PN sequence.

When the correlation value is detected, the controller may measure the start point of the preamble symbol using information about a Fast Fourier Transform (FFT) size and a size of a guard interval section of a pre-stored preamble symbol, in which the pre-stored PN sequence is included, and measure the frequency offset of the PN sequence from a phase difference between the detected PN sequence and the pre-stored PN sequence.

The controller may delay the detected PN sequence, perform a multiplying operation on the delayed PN sequence and the detected PN sequence to generate a new PN sequence, and compare the new PN sequence with the pre-stored PN sequence to detect the correlation value. Like the detected PN sequence, the pre-stored PN sequence may have been delayed, undergone a multiplying operation, and stored.

The preamble symbol detector may include: an FFT unit configured to transform the preamble symbol into a frequency domain signal based on the measured start point of the preamble symbol; an integer frequency offset (IFO) unit configured to compensate for frequency offset of the preamble symbol based on the measured frequency offset of the PN sequence on the transformed frequency domain signal; and a decoder configured to decode the preamble symbol having the compensated frequency offset.

According to an aspect of another exemplary embodiment, there is provided a transmitter including: a preamble symbol generator configured to generate a preamble symbol including an orthogonal frequency division multiplexing (OFDM) symbols; a PN sequence inserter configured to insert a PN sequence into the preamble symbol; and a transmitting unit configured to transmit a frame including the preamble symbol into which the PN sequence is inserted. The PN sequence may be used to measure a start point of the preamble symbol and frequency offset in a receiver.

A size of the PN sequence may be changed according to an FFT size of the preamble symbol.

The PN sequence inserter may insert the PN sequence so that a frequency band corresponding to the PN sequence is randomly arranged in a frequency band corresponding to the preamble symbol in which the PN sequence is inserted.

According to an aspect of still another exemplary embodiment, there is provided a frame processing method of a receiver. The frame processing method may include: receiving a frame including a preamble symbol into which a PN sequence is inserted; detecting the PN sequence of the received frame; measuring a start point of the preamble symbol and frequency offset of the PN sequence inserted in the preamble symbol, based on the detected PN sequence; and detecting the preamble symbol using the measured start point of the preamble symbol and the measured frequency offset of the PN sequence.

The PN sequence may be detected from a frequency band corresponding to the PN sequence by using a band-pass filter.

The frequency band corresponding to the preamble symbol may be shifted to arrange the frequency band corresponding to the PN sequence in a predetermined frequency band, and the PN sequence may be detected from the predetermined frequency band.

The detected PN sequence may be compared with a pre-stored PN sequence, when the detected PN sequence matches with the pre-stored PN sequence, a certain correlation value may be detected, and the start point of the preamble symbol and the frequency offset may be measured.

When the correlation value is detected, the start point of the stored preamble symbol may be measured based on information about an FFT size and a size of a guard interval section of the preamble symbol, and the frequency offset of the PN sequence may be measured from a phase difference between the detected PN sequence and the pre-stored PN sequence.

The detected PN sequence may be delayed, a multiplying operation may be performed on the delayed PN sequence and the detected PN sequence to generate a new PN sequence, and the new PN sequence may be compared with the pre-stored PN sequence to detect the maximum correlation value. Like the detected PN sequence, the pre-stored PN sequence may have been delayed, undergone a multiplying operation, and stored.

The preamble symbol may be transformed into a frequency domain signal based on the measured start point of the preamble symbol, the frequency offset of the preamble symbol may be compensated based on the measured frequency offset of the PN sequence on the transformed frequency domain signal, and the preamble symbol having the compensated frequency offset may be decoded.

According to another aspect of the exemplary embodiments, there is provided a frame transmitting method of transmitter. The frame transmitting method may include: generating a preamble symbol including OFDM symbols; inserting a PN sequence into the preamble symbol; and transmitting a frame including the preamble symbol into which the PN sequence is inserted. The PN sequence may be used to measure a start point of the preamble symbol and frequency offset in a receiver.

A size of the PN sequence may be changed according to an FFT size of the preamble symbol.

The PN sequence may be inserted to randomly arrange a frequency band corresponding to the PN sequence in a frequency band corresponding to the preamble symbol in which the PN sequence is inserted.

According to various exemplary embodiments of the inventive concept as described above, a receiver may accurately measure a start point of a preamble symbol and frequency offset and estimate a channel based on a PN sequence inserted in the preamble symbol.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
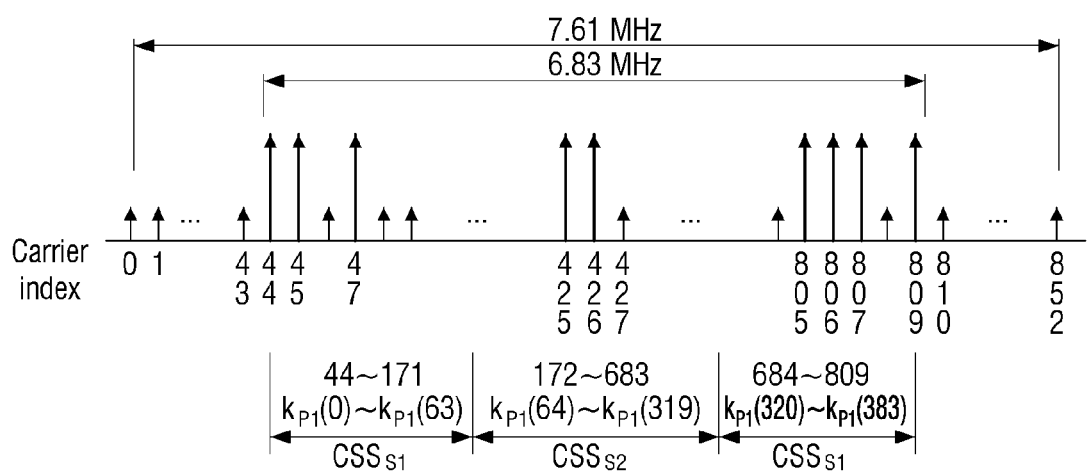
FIG. 1 is a view illustrating sub-carriers with which signaling data of a P1 preamble symbol is matched and which are randomly arranged.

Exemplary embodiments are described in greater detail with reference to the accompanying drawings.

In the following description, the same drawing reference numerals may be used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
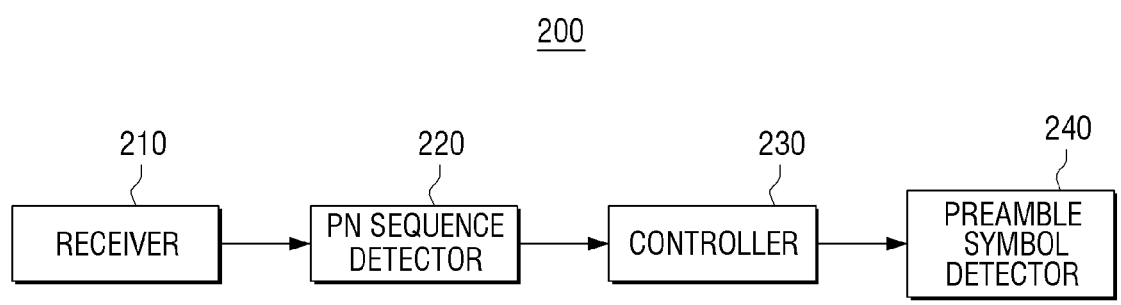
FIG. 2 is a block diagram illustrating a structure of a receiver according to an exemplary embodiment of the inventive concept.

FIG. 2 is a block diagram illustrating a structure of a receiver 200 according to an exemplary embodiment of the inventive concept.

Referring to FIG. 2, the receiver 200 includes a receiving unit 210, a pseudo random noise (PN) sequence detector 220, a controller 230, and a preamble symbol detector 240.

Here, the receiver 200 may receive a frame including a preamble symbol in which a PN sequence is inserted.

The preamble symbol may be used to detect a start point of the frame to synchronize the frame, and the receiver 200 may receive the frame that is transmitted according to a DVB-T2 method. Here, the frame may be a T2 frame. Also, a unit by which a signal is transmitted by using the DVB-T2 method is referred to as the T2 frame.

Therefore, a structure of the T2 frame will now be described in detail.

Figure 3:
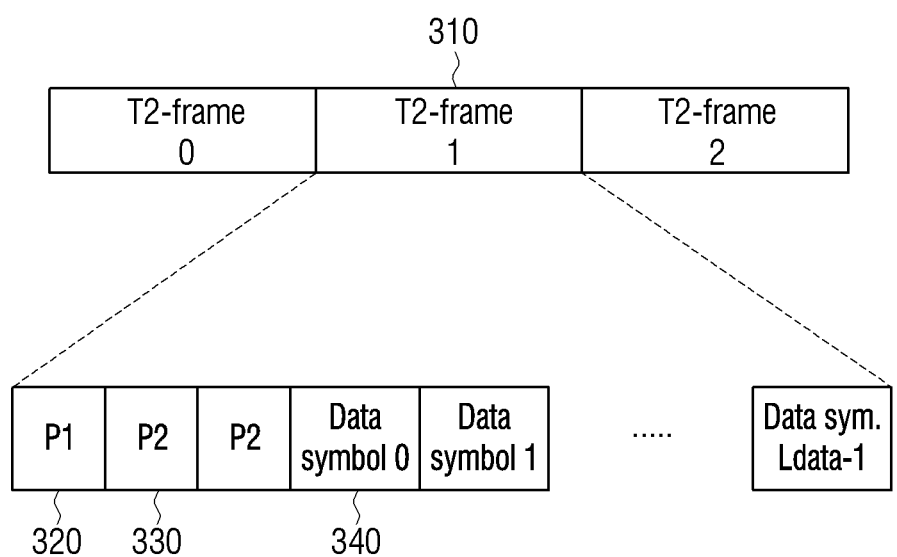
FIG. 3 is a view illustrating a structure of T2 frame according to an exemplary embodiment of the inventive concept.

FIG. 3 is a view illustrating a structure of T2 frame according to an exemplary embodiment of the inventive concept.

Referring to FIG. 3, a plurality of T2 frames are illustrated in a time domain of DVB-T2. One T2 frame 310 may include a P1 preamble symbol 320, a P2 preamble symbol 330 that transmits L1 signal Layer 1, and data symbols 340 that transmit broadcasting signals.

In detail, the P1 preamble symbol 320 may be positioned in a first part of the T2 frame 310 and may be used to detect a start point of the T2 frame 320. Also, the P1 preamble symbol 320 uses a 1 K-size Fast Fourier Transform (FFT) and takes a form of a guard interval signal. The P1 preamble symbol 320 of a frequency domain may use 384 of 853 sub-carrier waves of the 1 K-size FFT and transmit 7-bit information.

The receiver 200 according to the present exemplary embodiment may receive a frame including the P1 preamble symbol as described above. Hereinafter, the P1 preamble symbol may be referred to as a P1 symbol or a preamble symbol.

Here, a PN sequence may be inserted in the preamble symbol. The PN sequence refers to a sequence that shows a similar characteristic to random noise, has fixed rules, and is mainly used in spread spectrum mobile communication. The PN sequence may easily generate a long sequence in a PN generator and may rapidly perform initial synchronization in a mobile communication terminal.

In other words, the PN sequence has a characteristic to be used as an identifier. Therefore, if the above-described PN sequence is inserted in a preamble symbol, the receiver 200 may use the PN sequence to detect the preamble symbol.

The receiving unit 210 may receive the frame including the preamble symbol in which the PN sequence is inserted. Here, the PN sequence may be randomly inserted in the preamble symbol.

In other words, a position in which the PN sequence is to be inserted may not be fixed, and the PN sequence may be randomly inserted in the preamble symbol The PN sequence detector 220 may detect the PN sequence of the received frame.

Here, the PN sequence detector 220 may detect the PN sequence from a frequency band corresponding to the PN sequence by using a band-pass filter In other words, a frequency band corresponding to the preamble symbol may include the frequency band corresponding to the PN sequence. Also, the PN sequence detector 220 may extract only the frequency band corresponding to the PN sequence by using the band-pass filter having a bandwidth corresponding to the frequency band corresponding to the PN sequence.

Also, the PN sequence detector 220 may detect the PN sequence from the frequency band corresponding to the extracted PN sequence.

For example, if the frequency band corresponding to the preamble symbol is between 0 and 1704, and the frequency band corresponding to the PN sequence is between 0 and 767, the PN sequence detector 220 may extract the frequency band that is between 0 and 767 and corresponds to the PN sequence, by using the band-pass filter having a bandwidth of 768.

If the frequency band corresponding to the preamble symbol is between 0 and 1704, and the frequency band corresponding to the PN sequence is between 768 and 1535, the PN sequence detector 220 may extract the frequency band that is between 768 and 1535 and corresponds to the PN sequence, by using the band-pass filter having a bandwidth of 768.

According to another exemplary embodiment, the PN sequence detector 220 may shift the frequency band corresponding to the preamble symbol to arrange the frequency band corresponding to the PN sequence in a low frequency band and detect the PN sequence from this low frequency band by using a low-pass filter (LPF).

Figure 4:
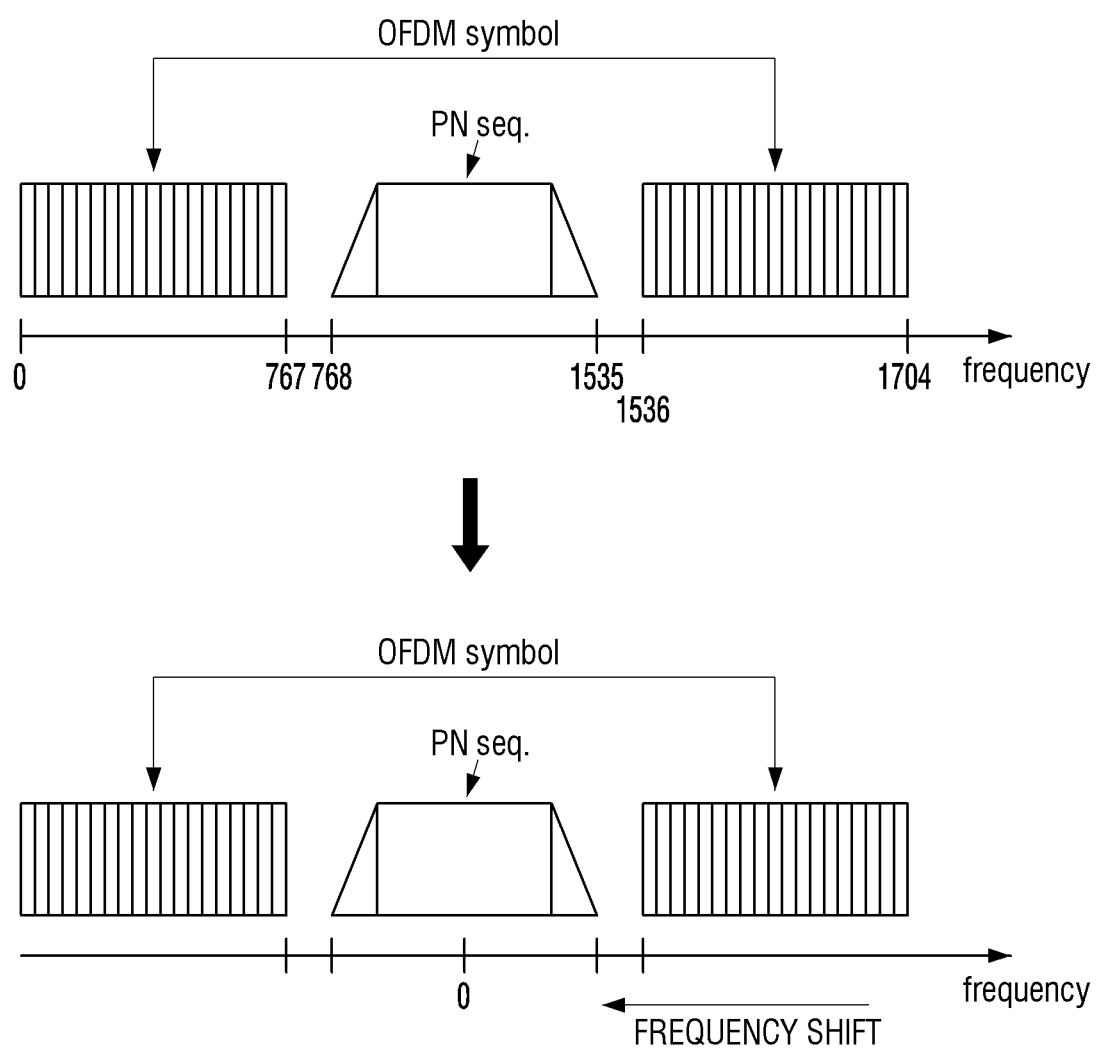
FIG. 4 is a view illustrating a frequency shifting process of arranging a frequency band corresponding to a pseudo random noise (PN) sequence in a low frequency band, according to an exemplary embodiment of the inventive concept.

For example, referring to FIG. 4, if the frequency band corresponding to the preamble symbol is between 0 and 1704, and the frequency band corresponding to the PN sequence is between 768 and 1535, the PN sequence detector 220 may shift a center frequency of the frequency band corresponding to the PN sequence to 0.

Therefore, the PN sequence detector 220 may arrange the frequency band corresponding to the PN sequence in a low frequency band.

Also, the PN sequence detector 220 may detect the PN sequence from this low frequency band by using an LPF.

As a result, although the PN sequence that is randomly inserted in the preamble symbol is in any position, the PN sequence detector 220 may shift the center frequency of the frequency band corresponding to the PN sequence to arrange the center frequency in the low frequency band, and detect the PN sequence from this low frequency band by using the LPF. Thus, the detected PN sequence may be a frequency-adjusted or a frequency-shifted PN sequence.

The controller 230 may measure a start point of the preamble symbol and frequency offset of the PN sequence inserted in the preamble symbol based on the detected PN sequence.

In detail, the controller 230 may compare the detected PN sequence with a pre-stored PN sequence, if the detected PN sequence matches with the pre-stored PN sequence, detect a maximum correlation value, and measure the start point of the preamble symbol and the frequency offset of the PN sequence.

Figure 5:
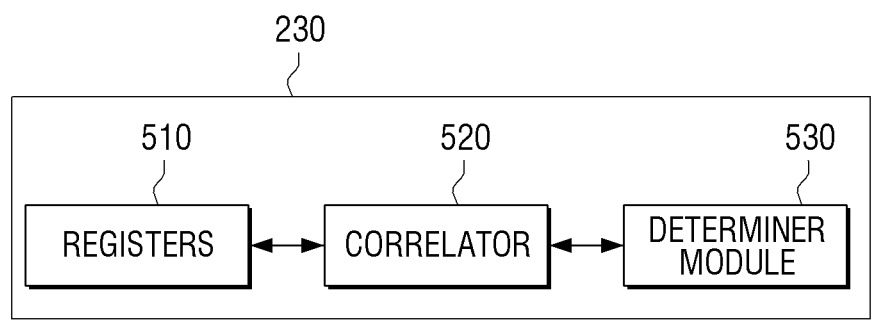
FIG. 5 is a block diagram illustrating a detailed structure of a controller according to an exemplary embodiment of the inventive concept.

FIG. 5 is a block diagram illustrating a detailed structure of the controller 230, according to an exemplary embodiment of the inventive concept.

Referring to FIG. 5, the controller 230 may include a plurality of registers 510, a correlator 520, and a determiner module 530 to compare the detected PN sequence with the pre-stored PN sequence. Alternatively, the controller 230 may include a plurality of registers, a plurality of correlators, and a determination module.

Here, a received PN sequence may be sequentially input into the plurality of registers 510 at preset time intervals. In other words, the PN sequence may be processed to be delayed at preset time intervals.

The received PN sequence may be sequentially input from a left register into a right register at the preset time intervals. Here, the plurality of registers 510 operate as shift registers.

If signals respectively input into the plurality of registers 510 are sequentially output, the correlator 520 may compare the output signals with the pre-stored PN sequence. If the output signals match with the pre-stored PN sequence, the correlator 520 may output a maximum correlation value, which may be set to a value greater that a predetermined threshold.

The determiner module 530 may determine that a detected PN sequence matches with the pre-stored PN sequence, based on the maximum correlation value output from the correlator 520.

Various types of well-known algorithms may be applied to compare the output signals with pre-stored several PN sequences. Alternatively, an algorithm that outputs "1" if the output signals match with the pre-stored several PN sequences and outputs "0" if the output signals do not match with the pre-stored several PN sequences may be applied.

The correlator 520 will now be described in more detail.

Figure 6A:
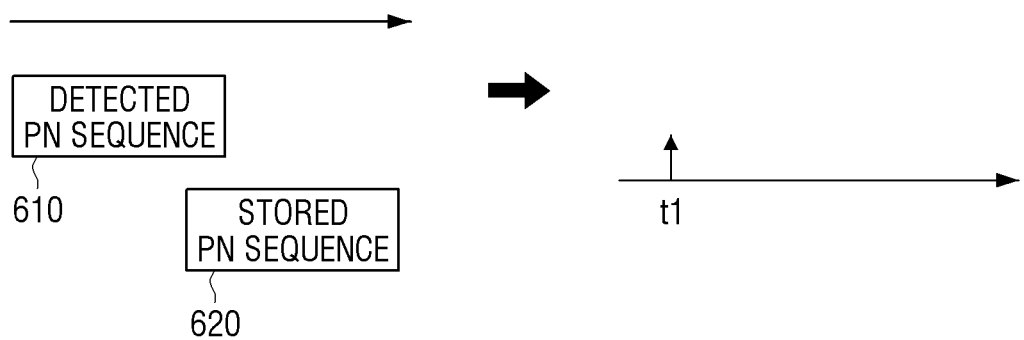
FIGS. 6A through 6C are views illustrating an operation of comparing a signal output from a plurality of registers with a pre-stored PN sequence, according to an exemplary embodiment of the inventive concept.
Figure 6B:
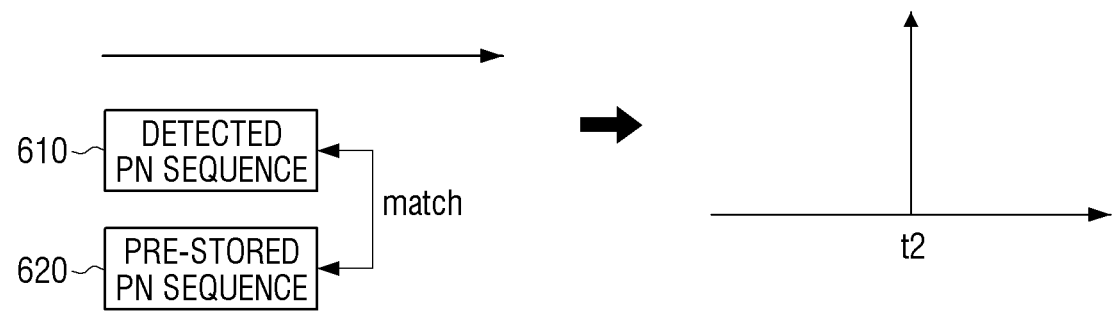
Figure 6C:
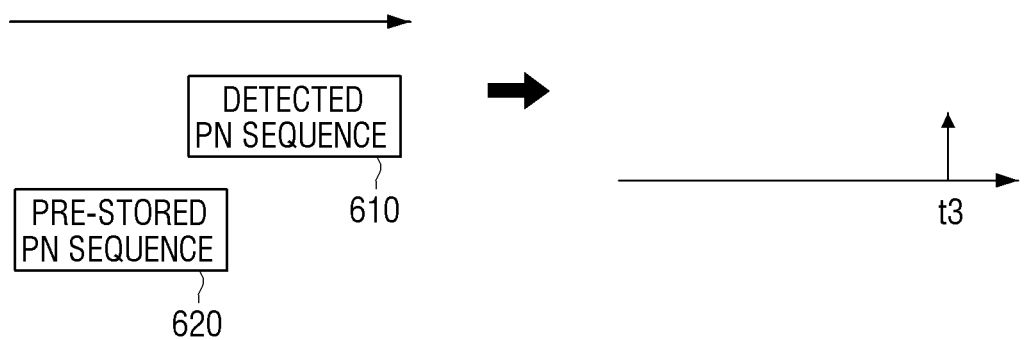

FIGS. 6A through 6C are views illustrating an operation of comparing outputs output from a plurality of registers with a pre-stored PN sequence, according to an exemplary embodiment of the inventive concept. Referring to FIG. 6A, a detected PN sequence 610 is compared with a pre-stored PN sequence 620.

As described above, the plurality of registers 510 may operate as a kind of shift registers, and an operation of calculating outputs through the plurality of registers 510 may be described as a right shift of the detected PN sequence 610.

If the detected PN sequence 610 output from the plurality of registers 510 is compared with the pre-stored PN sequence 620, the detected PN sequence 610 does not accurately match with the pre-stored PN sequence 620 at a time T1 as shown in FIG. 6A, and thus an output correlation value is very small.

Referring to FIG. 6B, if the detected PN sequence 610 accurately matches with the pre-stored PN sequence 620 at a time t2 after a preset time elapses, the output correlation value has a nearly peak value.

Referring to FIG. 6C, since the detected PN sequence 610 does not accurately match with the pre-stored PN sequence 620 at a time t3 after a preset time elapses, the output correlation is small.

Positions of the correlation value illustrated in a vertical axis of FIGS. 6A through 6C are shifted in order of times t1, t2, and t3, but this is only for understanding the inventive concept. Therefore, a size of the correlation value has a peak value or a value nearly close to 0 in a particular position, i.e., only the size of the correlation value is changed.

Therefore, the controller 230 may compare the detected PN sequence with the pre-stored PN sequence. If the detected PN sequence matches with the pre-stored PN sequence, the controller 230 may measure the start point of the preamble symbol and the frequency offset of the PN sequence.

Here, when the maximum correlation value is detected, and thus, it is determined that the detected PN sequence matches the pre-stored PN sequence, the controller 230 may measure the start point of the preamble symbol using information about an FFT size and a size of a guard interval section of a pre-stored preamble symbol in which the pre-stored PN sequence is included.

For example, if the maximum correlation value is detected at time t1, the controller 230 may determine that the detected PN sequence matches with the pre-stored PN sequence. Here, since the receiver 200 pre-stores information indicating that the FFT size of the preamble symbol is 2 K and the size of the guard interval section is 1 K, the controller 230 may measure the start point of the preamble symbol using the pre-stored information.

Here, for example, the controller 230 may delay the detected PN sequence, performs a multiplying operation on the delayed PN sequence to generate a new PN sequence, and compare the new PN sequence with the pre-stored PN sequence to detect the maximum correlation value. Here, like the detected PN sequence, the pre-stored PN sequence may have been delayed, undergone a multiplying operation, and stored.

A process of measuring the start point of the preamble symbol using the information about the FFT size of the preamble symbol and the size of the guard interval will be described in detail later.

When the maximum correlation value is detected, the controller 230 may measure the frequency offset of the PN sequence from a phase difference between the detected PN sequence and the pre-stored PN sequence.

For example, if an absolute value of a constellation of the detected PN sequence is equal to an absolute value of a constellation of the pre-stored PN sequence, and the detected PN sequence and the pre-stored PN sequence have a phase difference of 10°, the controller 230 may measure the frequency offset using the phase difference of 10°.

Similarly, the controller 230 may delay the detected PN sequence, perform a multiplying operation on the delayed PN sequence to generate a new PN sequence, and compare the new PN sequence with the pre-stored PN sequence to detect the maximum correlation value. Here, like the detected PN sequence, the pre-stored PN sequence may have been delayed, undergone a multiplying operation, and stored.

The controller 230 may estimate a channel by using the PN sequence.

The preamble symbol detector 240 may detect the preamble symbol according to the measured start point of the preamble symbol and the measured frequency offset of the PN sequence.

Figure 8:
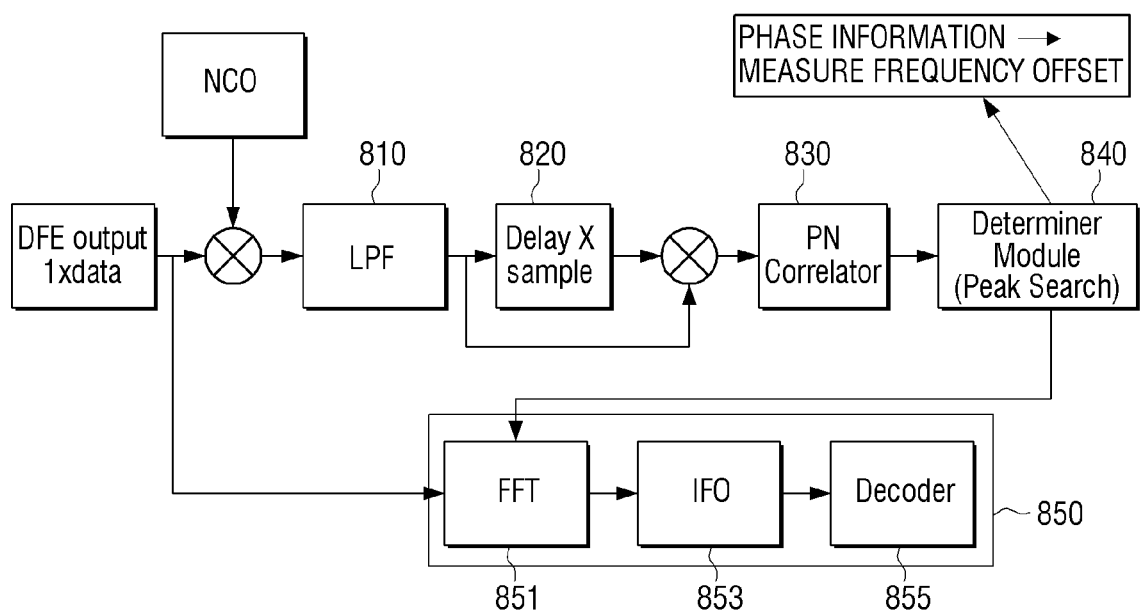
FIG. 8 is a block diagram illustrating a signal processing process of a receiver, according to an exemplary embodiment of the inventive concept.

The preamble symbol detector 240 may include an FFT unit (not shown), an integer frequency offset (IFO) unit (not shown), and a decoder (not shown) corresponding to an FFT unit 851, an IFO unit 853, and a decoder 855 shown in FIG. 8.

The FFT unit may transform the preamble symbol into a signal of a frequency domain based on the measured start point of the preamble symbol.

The IFO unit may compensate for frequency offset of the preamble symbol based on the frequency offset of the PN sequence measured on the signal of the transformed frequency domain.

The decoder may decode the preamble symbol having the compensated frequency offset.

Therefore, the preamble symbol detector 240 may detect the preamble symbol.

Figure 7A:
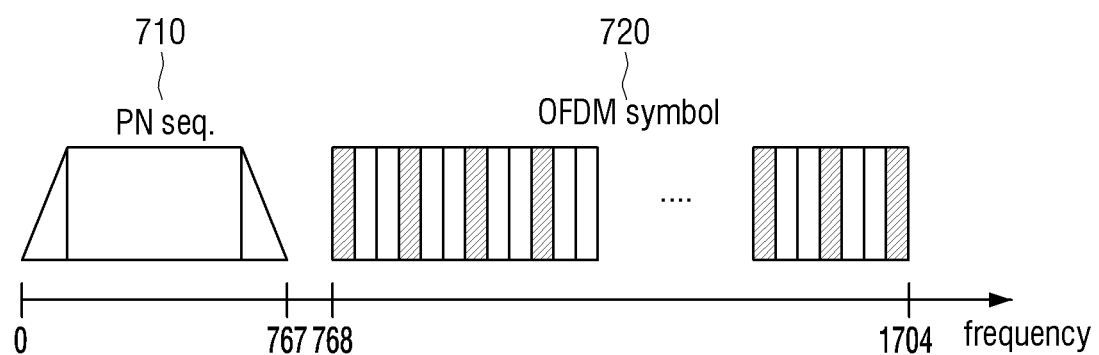
FIGS. 7A and 7B are views illustrating a structure of a frame, received by a receiver, which includes a preamble symbol in which a PN sequence is inserted, according to an exemplary embodiment of the inventive concept.
Figure 7B:
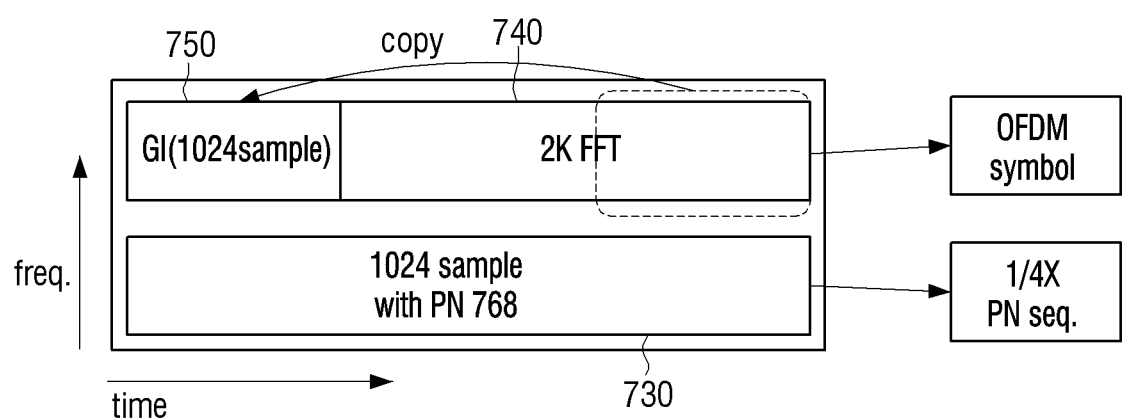

FIGS. 7A and 7B are views illustrating a structure of a frame received by the receiver 200. The frame includes a preamble symbol in which a PN sequence is inserted, according to an exemplary embodiment of the inventive concept.

Referring to FIG. 7A, a PN sequence 710 and orthogonal frequency division multiplexing (OFDM) symbols 720 are arranged in a frequency domain. Here, the PN sequence 710 is arranged in a low frequency band, and the OFDM symbols 720 are arranged in a high frequency band.

As described above, this is only an example, and the PN sequence 710 may be arranged between the OFDM symbols 720, or the PN sequence 710 may be arranged in the high frequency band and the OFDM symbol 720 may be arranged in the low frequency band. In this case, as described above, the PN sequence detector 220 may use a band-pass filter or shift a frequency band corresponding to a preamble symbol and detect a PN sequence by using an LPF.

Referring to FIG. 7B, the PN sequence 710 and the OFDM symbols 720 in the frequency domain of FIG. 7A are arranged in a time-frequency domain. In FIG. 7B, a PN sequence 730 that is inserted in a preamble symbol is positioned in a different frequency band from OFDM symbols 740.

Here, the PN sequence 730 may be oversampled according to an FFT size of the OFDM symbols 740.

For example, 768 sub carriers constituting the PN sequence 730 may be oversampled four times to be extended to be appropriate for a guard interval section 750 (1 K) and an FFT size (2 K) of the OFDM symbols 740.

If the FFT size of the OFDM symbols 740 is changed, 768 sub-carriers of the PN sequence 730 may be differently oversampled.

A last part of the OFDM symbols 740 is copied and then arranged in front of the OFDM symbols 740. The copied last part of the OFDM symbols 740 is the guard interval section 750. This is to allow the OFDM symbol 740 to prevent interference between symbols occurring by an echo.

If the detected PN sequence 730 is compared with a pre-stored PN sequence, and the detected PN sequence 730 matches with the pre-stored PN sequence, the controller 230 may detect a maximum correlation value and measure a preamble start point and frequency offset.

In detail, when the detected PN sequence 730 matches with the pre-stored PN sequence, and thus the maximum correlation value is detected, the controller 230 may measure a start point of a preamble symbol using information about an FFT size and a size of a guard interval section of a pre-stored preamble symbol. For example, when the maximum correlation value is detected, the controller 230 may determine a point of the preamble symbol delayed by the size of the guard interval section as the start point of the preamble symbol, i.e., as a start point of FFT transformation.

As shown in FIG. 7B, when the detected PN sequence 730 matches with the pre-stored PN sequence, and thus the maximum correlation value is detected, the controller 230 may determine a point delayed by the size 1 K of the guard interval section as the start point of the preamble symbol.

Referring to FIG. 7B, on a frequency axis, the PN sequence 730 is positioned in a low frequency band, and the OFDM symbols 740 are positioned in a high frequency band. Therefore, the PN sequence detector 220 may detect a PN sequence by using an LPF.

FIG. 8 is a block diagram illustrating a signal processing process of a receiver, according to an exemplary embodiment of the inventive concept.

As described above, if a frame is received, the frame passes through an LPF 810 to detect only a PN sequence. The detected PN sequence is input into a plurality of registers 820 and then sequentially output. If a PN correlator 830 outputs a correlation value according to whether the detected PN sequence matches with a pre-stored PN sequence, a determiner module 840 may measure a start point of a preamble symbol and frequency offset of the PN sequence according to the correlation value, and a preamble symbol detector 850 may detect a preamble symbol according to the measured start point of the preamble symbol and the measured frequency offset of the PN sequence.

Here, the plurality of registers 820 may be realized as a delay X sample block, the delay X sample block may delay the detected PN sequence integer times of a sample unit. Therefore, a multiplying operation may be performed on the detected PN sequence and the delayed PN sequence to generate a new PN sequence.

The PN correlator 830 may output the correlation value according to whether the new PN sequence matches with a pre-stored PN sequence that has been delayed integer times of a sample unit and undergone a multiplying operation. Here, if the correlation value output from the PN correlator 830 is the greatest, the determiner module 840 may measure the start point of the preamble using information about an FFT size and a size of a guard interval section of a pre-stored preamble symbol, and measure frequency offset using a phase value of the output correlation value.

Here, the preamble symbol detector 840 may include an FFT unit 851, an IFO unit 853, and a decoder 855. The FFT unit 851, the IFO unit 853, and the decoder 855 have been described above, and thus their detailed descriptions are omitted herein.

Figure 9:
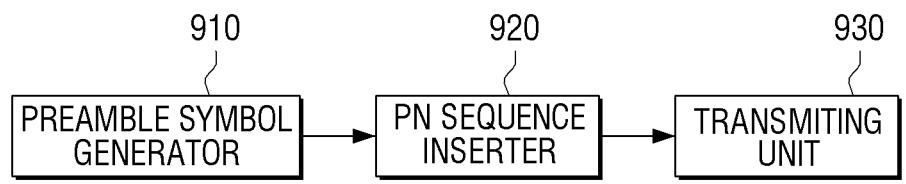
FIG. 9 is a block diagram illustrating a structure of a transmitter according to an exemplary embodiment of the inventive concept.

FIG. 9 is a block diagram illustrating a structure of a transmitter 900 according to an exemplary embodiment of the inventive concept.

Referring to FIG. 9, the transmitter 900 includes a preamble symbol generator 910, a PN sequence inserter 920, and a transmitting unit 930.

The transmitter 900 according to the present exemplary embodiment may transmit a plurality of signals by using a DVB-T2 method. A DVB-T2 system will now be described in detail.

Figure 10:
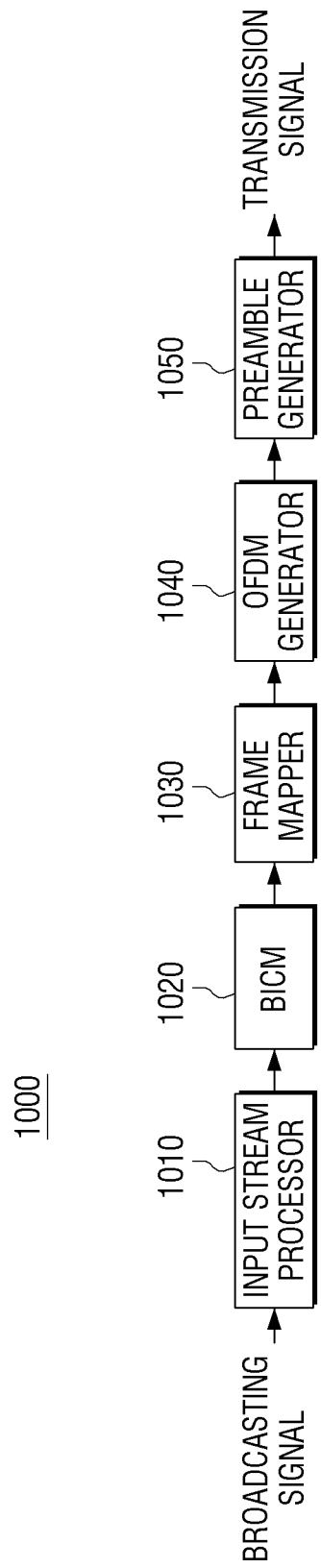
FIG. 10 is a block diagram of a Digital Video Broadcasting the Second Generation Terrestrial (DVB-T2) system according to an exemplary embodiment of the inventive concept.

FIG. 10 is a block diagram of a DVB-T2 system 1000 according to an exemplary embodiment of the inventive concept.

The DVB-T2 system 1000 of FIG. 10 generates a T2 signal by using a transmission method of DVB-T2. An input stream processor 1010 may generate a baseband frame format signal from an input broadcasting signal.

A bit-interleaved coded modulation (BICM) calculator 1020 may code the input baseband frame format signal through LDPC and modulate the coded signal.

Here, the DVB-T2 method includes LDPC codes having 64,800 bits and 16,400 bits and code an input signal according to various code rates. A coded signal may be modulated through quadrature phase shift keying (QPSK), 16 quadrature amplitude modulation (QAM), 64 QAM, or 256 QAM.

A frame mapper 1030 may generate a T2 frame structure for OFDM transmission. Here, the T2 frame structure may include a data sub-carrier for transmitting a signal into which a broadcasting signal is modulated, a pilot for estimating a channel, and sub-carriers (or reserved tones) for reducing a peak to average power ratio (PAPR).

An OFDM generator 1040 may transform a signal input from the frame mapper 1030 into a time domain signal by using an Inverse Fast Fourier Transform (IFFT) method that transforms a frequency domain signal into a time domain signal.

A preamble generator 1050 may add a preamble to a start part of the T2 frame to generate a transmission signal so that the preamble is used for synchronization of the T2 frame at a receiver of the broadcasting signal.

The preamble generator 1050 of FIG. 10 may correspond to P1 symbol inserter of a modulator module of the DVB-T2 system 1000.

Here, if guard insertion (GI) information where a last part of an OFDM symbol is copied to insert a guard interval in a cyclic prefix (CP) format into each OFDM symbol is transmitted from a GI unit to the P1 symbol inserter, the P1 symbol inserter may insert two or more preamble symbols into each frame. If two or more preamble symbols are used, the broadcasting signal may be more robust against burst fading that may occur in a mobile fading environment, and a signal detection performance may be improved.

The P1 symbol inserter inserts a P1 symbol into a start part of each frame and outputs each frame to a digital-to-analog converter (DAC).

The preamble symbol P1 serves four main purposes. First, the preamble symbol P1 is used for an initial signal scan that is sufficient for sensing the P1 symbol for a fast recognition of a T2 frame. This structure of the T2 frame with the preamble symbol P1 enables sensing any frequency offset even when a receiver is adjusted in a nominal center frequency. This structure of the T2 frame with the preamble symbol P1 also reduces a scanning time because the receiver does not need to additionally test all possible offsets.

Secondly, the preamble symbol P1 is used as a T2 preamble to identify the T2 preamble itself. The preamble symbol P1 may be used to distinguish the preamble symbol P1 from another format that is used in a future extension frame (FEF) part coexisting in the same super-frame including a plurality of T2 frames.

Third, the preamble symbol P1 is used to transmit a basic transmission parameter signal necessary for decoding the remaining parts of the preamble symbol that may help an initialization process. Fourth, the preamble symbol P1 is used to allow the receiver to detect and correct frequency and time synchronization.

Referring to FIG. 9 again, the preamble symbol generator 910 may generate a preamble symbol, that is a P1 symbol, including OFDM symbols. Here, a function of the preamble symbol is as described above.

The PN sequence inserter 920 may insert a PN sequence in the preamble symbol.

Here, the PN sequence may be used to measure a start point of the preamble symbol and frequency offset in the receiver.

The PN sequence may also be used to estimate a channel in the receiver.

A size of the PN sequence may be changed according to an FFT size of the preamble symbol.

In other words, the number of times of oversampling of the PN sequence varies according to the FFT size of the preamble symbol (i.e., when the FFT size of the preamble symbol is 2 K and 4 K), and thus a size of the PN sequence varies.

The PN sequence inserter 920 may insert the PN sequence so that a frequency band corresponding to the PN sequence is randomly arranged in a frequency band corresponding to a preamble symbol in which the PN sequence is inserted.

In other words, the PN sequence inserter 920 may arbitrarily insert the PN sequence regardless of a low frequency band or a high frequency band in the frequency band corresponding to the preamble symbol in which the PN sequence is inserted.

The transmitter 930 may transmit a frame including the preamble symbol in which the PN sequence is inserted. Here, the transmitter 930 may transmit a plurality of signals by using an OFDM method.

In detail, the OFDM refers to a modulation method of multiplexing a high-speed transmission signal into a plurality of orthogonal narrowband carriers (sub-carriers). In other words, the OFDM method is to divide a data stream having a high-speed transmission rate into a large number of data streams having low transmission rates and simultaneously transmit the large number of data streams by using a plurality of sub-carriers. The OFDM method is a multiplexing technique in that a high-speed original data stream of one channel is simultaneously transmitted through a multichannel and is a modulation technique in that divided data streams are transmitted with a multiple sub-carrier. A waveform of each sub-carrier is orthogonal on a time axis but overlaps on a frequency axis.

Figure 11:
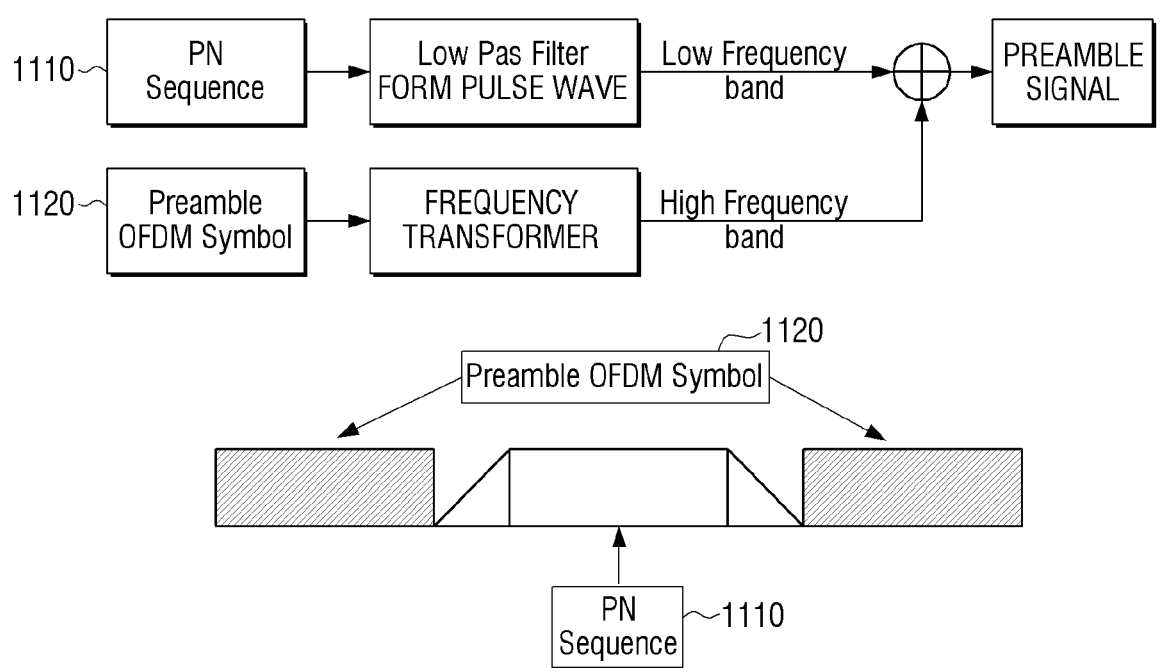
FIG. 11 is a view illustrating a preamble symbol into which a PN sequence is inserted, according to an exemplary embodiment of the inventive concept.

FIG. 11 is a view illustrating a preamble symbol in which a PN sequence is inserted, according to an exemplary embodiment of the inventive concept.

Referring to FIG. 11, the preamble symbol generator 910 transforms a frequency of a generated preamble symbol 1120 and arranges the preamble symbol 1120 in a high frequency band. Also, the PN sequence inserter 920 arranges a PN sequence 1110 in a low frequency band by using an LPF to arrange the PN sequence 1110 in the low frequency band.

The PN sequence 1110 is described as being arranged in the low frequency band in FIG. 11 but the inventive concept in this regard is not limited thereto. The PN sequence 1110 may be arranged in any frequency band.

Figure 12:
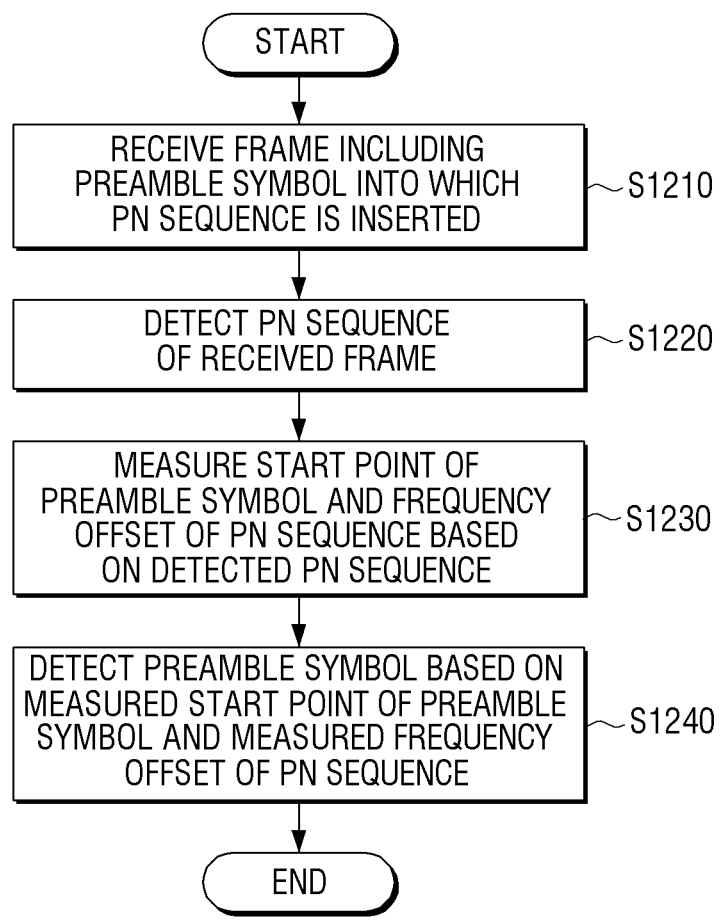
FIG. 12 is a flowchart of a frame processing method of a receiver, according to an exemplary embodiment of the inventive concept.

FIG. 12 is a flowchart of a frame processing method at a receiver, according to an exemplary embodiment of the inventive concept.

Referring to FIG. 12, in operation S1210, the receiver receives a frame including a preamble symbol in which a PN sequence is inserted.

In operation S1220, the receiver detects the PN sequence of the received frame. Here, the receiver may detect the PN sequence from a frequency band corresponding to the PN sequence by using a band-pass filter.

The receiver may shift a frequency band corresponding to the preamble symbol to arrange the frequency band corresponding to the PN sequence in a low frequency band and detect the PN sequence from this low frequency band by using an LPF. Here, the detected PN sequence may be a frequency-adjusted or frequency-shifted PN sequence.

In operation S1230, the receiver measures a start point of the preamble symbol and frequency offset of the PN sequence based on the detected PN sequence.

Here, in operation S1230, the receiver may compare the detected PN sequence with a pre-stored PN sequence, if the detected PN sequence matches with the pre-stored PN sequence, detect a maximum correlation value, and measure the start point of the preamble symbol and the frequency offset.

In operation S1230, when the maximum correlation value is detected, the receiver may measure the start point of the preamble symbol using information about an FFT size and a size of a guard interval section of the pre-stored preamble symbol, and measure the frequency offset from a phase difference between the detected PN sequence and the pre-stored PN sequence.

Here, in operation S1230, the receiver may delay the detected PN sequence, perform a multiplying operation on the delayed PN sequence and the detected PN sequence to generate a new PN sequence, and compare the new PN sequence with the pre-stored PN sequence to detect the maximum correlation value. Here, like the detected PN sequence, the pre-stored PN sequence may be delayed, undergo a multiplying operation, and may be stored.

In operation S1240, the receiver detects the preamble symbol according to the measured start point of the preamble symbol and the measured frequency offset of the PN sequence.

Here, in operation S1240, the receiver may transform the preamble symbol into a frequency domain signal based on the measured start point of the preamble symbol, compensate for frequency offset of the preamble symbol based on the frequency offset of the PN sequence measured on the transformed frequency domain signal, and decode the preamble symbol having the compensated frequency offset.

Figure 13:
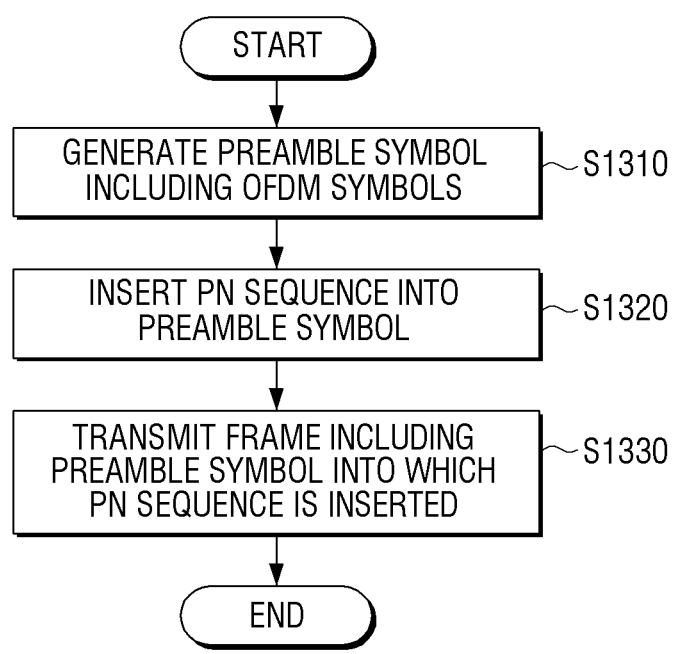
FIG. 13 is a flowchart of a frame transmitting method of a transmitter, according to an exemplary embodiment of the inventive concept.

FIG. 13 is a flowchart of a frame transmitting method of a transmitter, according to an exemplary embodiment of the inventive concept.

Referring to FIG. 12, in operation S1310, the transmitter generates a preamble symbol including OFDM symbols.

In operation S1320, the transmitter inserts a PN sequence in the preamble symbol. Here, a size of the PN sequence may be changed according to an FFT size of the preamble symbol.

Also, in operation S1320, the transmitter may insert the PN sequence so that a frequency band corresponding to the PN sequence is randomly arranged in a frequency band corresponding to the preamble symbol in which the PN sequence is inserted. In operation S1330, the transmitter transmits a frame including the preamble symbol in which the PN sequence is inserted.

According to various exemplary embodiments of the inventive concept as described above, a receiver may accurately measure a start point of a preamble symbol and frequency offset of a PN sequence and estimate a channel by using the PN sequence inserted in the preamble symbol.

There may be provided a non-transitory computer-readable medium that stores a program that sequentially performs a controlling method according to an exemplary embodiment of the inventive concept.

For example, there may be provided a non-transitory computer-readable medium that stores a program performing: detecting a PN sequence of a received frame; measuring a start point of a preamble symbol and frequency offset of the PN sequence based on the detected PN sequence; and detecting the preamble symbol based on the measured start point of the preamble symbol and the measured frequency offset of the PN sequence.

Also, there may be provided a non-transitory computer-readable medium that stores a program performing: generating a preamble symbol including OFDM symbols; and inserting a PN sequence in the preamble symbol.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a compact disc (CD), a digital versatile disc (DVD), a hard disk, a blue-ray disk, a universal serial bus (USB), a memory card, a ROM, or the like.

Components, elements or units represented by a block as illustrated in FIGS. 2, 5 and 8-10 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components or elements may further include a processor such as a central processing unit (CPU) that performs the respective functions, a microprocessor, or the like.

The foregoing exemplary embodiments and advantages are merely exemplary and are not to be construed as limiting. Also, the descriptions of the exemplary embodiments are intended to be illustrative, and not to limit the scope of the inventive concept, and many alternatives, modifications, and variations will be apparent to those skilled in the art.

What is claimed is:

1. A receiver comprising:
 a receiving unit configured to receive a frame comprising a preamble symbol in which a pseudo random noise (PN) sequence is inserted;
 a PN sequence detector configured to detect the PN sequence from the received frame;
 a controller configured to measure a start point of the preamble symbol and frequency offset of the PN sequence inserted in the preamble symbol, based on the detected PN sequence; and
 a preamble symbol detector configured to detect the preamble symbol according to the measured start point of the preamble symbol and the measured frequency offset of the PN sequence.

2. The receiver of claim 1, wherein the PN sequence detector detects the PN sequence from a frequency band corresponding to the PN sequence by using a band-pass filter.

3. The receiver of claim 1, wherein the PN sequence detector shifts a frequency band corresponding to the preamble symbol to arrange a frequency band corresponding to the PN sequence in a predetermined frequency band and detects the PN sequence from the predetermined frequency band.

4. The receiver of claim 1, wherein the controller compares the detected PN sequence with a pre-stored PN sequence and, if the detected PN sequence matches with the pre-stored PN sequence, measures the start point of the preamble symbol and the frequency offset of the PN sequence.

5. The receiver of claim 4, wherein the controller detects a certain correlation value if the detected PN sequence matches with the pre-stored PN sequence, and
 wherein when the maximum correlation value is detected, the controller measures the start point of the preamble symbol using information about a Fast Fourier Transform (FFT) size and a size of a guard interval section of a pre-stored preamble symbol, in which the pre-stored PN sequence is included, and measures the frequency offset of the PN sequence from a phase difference between the detected PN sequence and the pre-stored PN sequence.

6. The receiver of claim 5, wherein the controller delays the detected PN sequence, performs a multiplying operation on the delayed PN sequence and the detected PN sequence to generate a new PN sequence, and compares the new PN sequence with the pre-stored PN sequence to detect the correlation value,
 wherein the pre-stored PN sequence is a PN sequence which has been delayed, undergone a multiplying operation, and stored.

7. The receiver of claim 1, wherein the preamble symbol detector comprises:
 an FFT unit configured to transform the preamble symbol into a frequency domain signal based on the measured start point of the preamble symbol;
 an integer frequency offset (IFO) unit configured to compensate for frequency offset of the preamble symbol based on the measured frequency offset of the PN sequence on the transformed frequency domain signal; and
 a decoder configured to decode the preamble symbol having the compensated frequency offset.

8. A transmitter comprising:
 a preamble symbol generator configured to generate a preamble symbol comprising orthogonal frequency division multiplexing (OFDM) symbols;
 a pseudo random noise (PN) sequence inserter configured to insert a PN sequence into the preamble symbol; and a transmitting unit configured to transmit a frame comprising the preamble symbol into which the PN sequence is inserted, wherein the PN sequence is used to measure a start point of the preamble symbol and frequency offset in a receiver.

9. The transmitter of claim 8, wherein a size of the PN sequence is changed according to a Fast Fourier Transform (FFT) size of the preamble symbol.

10. The transmitter of claim 8, wherein the PN sequence inserter inserts the PN sequence so that a frequency band corresponding to the PN sequence is randomly arranged in a frequency band corresponding to the preamble symbol in which the PN sequence is inserted.

11. A frame processing method of a receiver, the frame processing method comprising:
receiving a frame comprising a preamble symbol in which a pseudo random noise (PN) sequence is inserted;
detecting the PN sequence from the received frame;
measuring a start point of the preamble symbol and frequency offset of the PN sequence inserted in the preamble symbol, based on the detected PN sequence; and
detecting the preamble symbol according to the measured start point of the preamble symbol and the measured frequency offset of the PN sequence.

12. The frame processing method of claim 11, wherein the PN sequence is detected from a frequency band corresponding to the PN sequence by using a band-pass filter.

13. The frame processing method of claim 11, wherein a frequency band corresponding to the preamble symbol is shifted to arrange a frequency band corresponding to the PN sequence in a predetermined frequency band, and the PN sequence is detected from the predetermined frequency band.

14. The frame processing method of claim 11, wherein the detected PN sequence is compared with a pre-stored PN sequence, and, if the detected PN sequence matches with the pre-stored PN sequence, the start point of the preamble symbol and the frequency offset are measured.

15. The frame processing method of claim 14, wherein if the detected PN sequence matches the pre-stored PN sequence, a certain correlation value is detected, and
wherein when the maximum correlation value is detected, the start point of the stored preamble symbol is measured using information about a Fast Fourier Transform (FFT) size and a size of a guard interval section of the preamble symbol, and the frequency offset of the PN sequence is measured from a phase difference between the detected PN sequence and the pre-stored PN sequence.

16. The frame processing method of claim 15, wherein the detected PN sequence is delayed, a multiplying operation is performed on the delayed PN sequence and the detected PN sequence to generate a new PN sequence, and the new PN sequence is compared with the pre-stored PN sequence to detect the correlation value,
wherein the pre-stored PN sequence is a PN sequence which has been delayed, undergone a multiplying operation, and stored.

17. The frame processing method of claim 11, wherein the preamble symbol is transformed into a frequency domain signal based on the measured start point of the preamble symbol, the frequency offset of the preamble symbol is compensated based on the measured frequency offset of the PN sequence on the transformed frequency domain signal, and the preamble symbol having the compensated frequency offset is decoded.

18. A frame transmitting method of transmitter, the frame transmitting method comprising:
generating a preamble symbol comprising orthogonal frequency division multiplexing (OFDM) symbols;
inserting a pseudo random noise (PN) sequence into the preamble symbol; and
transmitting a frame comprising the preamble symbol into which the PN sequence is inserted,
wherein the PN sequence is used to measure a start point of the preamble symbol and frequency offset in a receiver.

19. The frame transmitting method of claim 18, wherein a size of the PN sequence is changed according to a Fast Fourier Transform (FFT) size of the preamble symbol.

20. The frame transmitting method of claim 18, wherein the PN sequence is inserted so that a frequency band corresponding to the PN sequence is randomly arranged in a frequency band corresponding to the preamble symbol in which the PN sequence is inserted.

* * * * *